(12) United States Patent
Suzuki (10) Patent No.: US 10,940,853 B2
(45) Date of Patent: Mar. 9, 2021

(54) VEHICULAR TURNING CONTROL SYSTEM

(71) Applicant: NTN CORPORATION, Osaka (JP)

(72) Inventor: Yuta Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 197 days.

(21) Appl. No.: 16/294,507

(22) Filed: Mar. 6, 2019

(65) Prior Publication Data
US 2019/0202441 A1 Jul. 4, 2019

Related U.S. Application Data

(63) Continuation of application No. PCT/JP2017/031487, filed on Aug. 31, 2017.

(30) Foreign Application Priority Data

Sep. 7, 2016 (JP) .............................. JP2016-174287

(51) Int. Cl.
*B60W 30/02* (2012.01)
*B60W 30/045* (2012.01)
(Continued)

(52) U.S. Cl.
CPC ......... *B60W 30/045* (2013.01); *B60K 17/356* (2013.01); *B60T 8/1755* (2013.01);
(Continued)

(58) Field of Classification Search
USPC ..................................................... 701/36–48
See application file for complete search history.

(56) References Cited

U.S. PATENT DOCUMENTS 6,158,826 A * 12/2000 Yasuda ................. B60T 8/1755
303/146
6,219,609 B1 * 4/2001 Matsuno ............... B60T 8/1755
303/140
(Continued)

FOREIGN PATENT DOCUMENTS

EP 0 970 876 A2 1/2000
JP 9-71231 3/1997
(Continued)

OTHER PUBLICATIONS

Notice of Reasons for Refusal dated Apr. 21, 2020, in corresponding Japanese Patent Application No. 2016-174287 (10 pages).
(Continued)

*Primary Examiner* — Jonathan L Sample (57) ABSTRACT

Provided is a vehicular turning control system that enables immediate stabilization of the vehicle attitude and optimum control for the vehicle turning performance. This vehicular turning control system includes a yaw moment control device, a vehicle attitude stabilization control device, and a torque limiting device. A first torque limiter of the torque limiting device limits a braking/driving torque calculated by a yaw moment controller, in accordance with the slip rate of the wheel and the angular acceleration of the wheel. A second torque limiter of the torque limiting device limits a braking/driving torque calculated by a vehicle attitude stabilization controller, in accordance with the slip rate of the wheel and the angular acceleration of the wheel. The vehicle turning performance is optimally controlled by limiting each braking/driving torque in accordance with the slip rate of the wheel and the angular acceleration of the wheel as described above.

4 Claims, 10 Drawing Sheets

(51) Int. Cl.
  *B60T 8/1755* (2006.01)
  *B60K 17/356* (2006.01)
  *B60W 10/119* (2012.01)
  *B60W 10/184* (2012.01)
  *B60L 15/20* (2006.01)

(52) U.S. Cl.
  CPC ........ *B60W 10/119* (2013.01); *B60W 10/184* (2013.01); *B60W 30/02* (2013.01); *B60L 15/20* (2013.01); *B60W 2520/14* (2013.01); *B60W 2520/16* (2013.01); *B60W 2720/16* (2013.01); *B60W 2720/40* (2013.01); *Y02T 10/72* (2013.01)

(56) References Cited

U.S. PATENT DOCUMENTS

| | | | |
|---|---|---|---|
| 6,223,116 B1* | 4/2001 | Kin | B60T 8/17551 180/197 |
| 10,093,308 B2 | 10/2018 | Sugai | |
| 2005/0288142 A1* | 12/2005 | Yamanaka | B62D 5/008 475/4 |
| 2007/0050112 A1* | 3/2007 | Kroehnert | B60T 8/17555 701/41 |
| 2008/0183353 A1* | 7/2008 | Post | B60T 8/17555 701/42 |
| 2009/0037053 A1* | 2/2009 | Yamazaki | B60K 23/04 701/41 |
| 2010/0114449 A1* | 5/2010 | Shiozawa | B60T 8/172 701/90 |
| 2010/0250083 A1* | 9/2010 | Takahashi | B60T 8/1755 701/70 |
| 2012/0123643 A1* | 5/2012 | Limpibuntering | B62D 1/286 701/42 |
| 2013/0253770 A1* | 9/2013 | Nishikawa | B60W 10/20 701/42 |
| 2015/0046035 A1* | 2/2015 | Kikuchi | B60G 17/06 701/37 |
| 2016/0075237 A1* | 3/2016 | Zhang | B60L 3/106 701/22 |
| 2016/0152237 A1* | 6/2016 | Takahashi | B62D 5/0463 701/41 |
| 2017/0166203 A1* | 6/2017 | Sugai | B60K 7/0007 |

FOREIGN PATENT DOCUMENTS

| | | |
|---|---|---|
| JP | 11-240434 | 9/1999 |
| JP | 2000-25599 | 1/2000 |
| JP | 2008-87680 | 4/2008 |
| JP | 2015-209128 | 11/2015 |
| JP | 2016-20168 | 2/2016 |
| JP | 2016-111779 A | 6/2016 |
| WO | 2016/035665 A1 | 3/2016 |

OTHER PUBLICATIONS

Extended European Search Report dated Mar. 23, 2020, in corresponding European Patent Application No. 17848660.1 (8 pages).
English Translation by WIPO of the International Preliminary Report on Patentability dated Mar. 21, 2019 in corresponding International Patent Application No. PCT/JP2017/031487 (11 pages).
International Search Report dated Nov. 7, 2017 in corresponding International Application No. PCT/JP2017/031487.

* cited by examiner

CONDITION (1): SLIP RATES OF RIGHT AND LEFT WHEELS ARE EQUAL TO OR GREATER THAN THRESHOLD VALUE S
AND
CONDITION (2): WHEEL ANGULAR ACCELERATION IS EQUAL TO OR GREATER THAN THRESHOLD VALUE $\omega'$

CASE OF FOUR-WHEEL IWM VEHICLE

→ DRIVING TORQUE (IWM)   ---→ BRAKING TORQUE (IWM)

(a) CASE OF FOUR-WHEEL DRIVE VEHICLE
(YAW MOMENT CONTROL BY FRICTION BRAKE)

→ DRIVING TORQUE (ENGINE OUTPUT)   ⇢ BRAKING TORQUE (FRICTION BRAKE)

(b) CASE OF FRONT-WHEEL DRIVE VEHICLE
(YAW MOMENT CONTROL BY FRICTION BRAKE)

→ DRIVING TORQUE (ENGINE OUTPUT)   ⇢ BRAKING TORQUE (FRICTION BRAKE)

(c) CASE OF REAR-WHEEL DRIVE VEHICLE
(YAW MOMENT CONTROL BY FRICTION BRAKE)

→ DRIVING TORQUE (ENGINE OUTPUT)   ⇢ BRAKING TORQUE (FRICTION BRAKE)

VEHICULAR TURNING CONTROL SYSTEM

CROSS REFERENCE TO THE RELATED APPLICATION

This application is a continuation application, under 35 U.S.C. § 111(a), of international application No. PCT/JP2017/031487, filed Aug. 31, 2017, which is based on and claims Convention priority to Japanese patent application No. 2016-174287, filed Sep. 7, 2016, the entire disclosure of which is herein incorporated by reference as a part of this application.

BACKGROUND OF THE INVENTION

Field of the Invention

The present invention relates to a vehicular turning control system which optimally controls vehicle turning performance by reducing a braking/driving force in accordance with slip of a wheel before breakdown of a tire force.

Description of Related Art

Conventionally, technology is proposed in which a road surface frictional coefficient is estimated using an acceleration sensor and the like mounted on a vehicle, and yaw angular acceleration model following control or yaw moment control such as ESC is effected in accordance with the road surface frictional coefficient. For example, a control device is proposed which estimates a road surface frictional coefficient by an outside recognition unit mounted on a vehicle and optimally controls a target moment calculated from the vehicle speed and the steering angle, in accordance with the road surface frictional coefficient (Patent Document 1).

RELATED DOCUMENT

Patent Document

[Patent Document 1] JP Laid-open Patent Publication No. 2016-20168

In the method for estimating the road surface frictional coefficient in Patent Document 1, for example, in the case where the road surface frictional coefficient is estimated using an acceleration sensor or the like, it takes time until an acceleration occurs after turning is performed. Therefore, estimation for the road surface frictional coefficient is delayed, so that the vehicle might become unstable due to yaw moment control. In addition, in the method for estimating the road surface frictional coefficient in Patent Document 1, in the case where the road surface frictional coefficient is estimated by the outside recognition unit, for example, if a deviation occurs between the estimated road surface frictional coefficient and an actual road surface frictional coefficient, there is a possibility that an appropriate target yaw moment is not calculated.

SUMMARY OF THE INVENTION

An object of the present invention is to provide a vehicular turning control system that enables immediate stabilization of the vehicle attitude and optimum control for the vehicle turning performance.

In the following description, the reference characters in the embodiments are used for convenience sake in order to facilitate the understanding.

A vehicular turning control system according to the present invention is a vehicular turning control system controlling a turning characteristic of a vehicle 1 having braking/driving sources 4 capable of independently controlling a braking/driving torque which is a braking torque or a driving torque for each of wheels 2, the vehicular turning control system including: a yaw moment control device 14 configured to control a yaw moment that occurs in the vehicle 1; and a vehicle attitude stabilization control device 15 configured to perform control for stabilizing an attitude of the vehicle 1. The yaw moment control device 14 includes a target yaw rate calculator 25 configured to calculate a target yaw rate from a vehicle speed and a steering angle, a yaw moment calculator 27 configured to calculate the yaw moment that occurs in the vehicle 1, from the vehicle speed, the steering angle, and the target yaw rate calculated by the target yaw rate calculator 25, and a yaw moment controller 28 configured to calculate a braking/driving torque for each wheel 2 in accordance with the yaw moment calculated by the yaw moment calculator 27. The vehicle attitude stabilization control device 15 includes a vehicle attitude state calculator 30 configured to calculate an attitude state of the vehicle from a deviation between the target yaw rate and an actual yaw rate detected by a yaw rate detector 20 provided to the vehicle 1, and a vehicle attitude stabilization controller 31 configured to calculate a braking/driving torque for each wheel 2 in accordance with the attitude state of the vehicle 1 calculated by the vehicle attitude state calculator 30. The vehicular turning control system further includes: a first torque limiter 32a configured to limit the braking/driving torque calculated by the yaw moment controller 28, in accordance with a slip rate of the wheel 2 and an angular acceleration of rotation of the wheel 2; and a second torque limiter 32b configured to limit the braking/driving torque calculated by the vehicle attitude stabilization controller 31, in accordance with a slip rate of the wheel 2 and an angular acceleration of rotation of the wheel 2.

In this configuration, the yaw moment calculator 27 calculates a yaw moment that occurs in the vehicle 1, from the vehicle speed, the steering angle, and the target yaw rate calculated by the target yaw rate calculator 25. The yaw moment controller 28 calculates the braking/driving torque for each wheel 2 in accordance with the calculated yaw moment. From this braking/driving torque, a torque command value Y is calculated. The vehicle attitude state calculator 30 calculates the attitude state of the vehicle 1 from a deviation between the detected actual yaw rate and the target yaw rate. The vehicle attitude stabilization controller 31 calculates the braking/driving torque for each wheel 2 in accordance with the attitude state of the vehicle 1. From this braking/driving torque, a torque command value E is calculated. A final torque command value is calculated from the torque command value Y calculated by the yaw moment controller 28 and the torque command value E calculated by the vehicle attitude stabilization controller 31, and each wheel 2 is controlled in accordance with the final torque command value.

The first torque limiter 32a limits the braking/driving torque calculated by the yaw moment controller 28, in accordance with the slip rate of the wheel 2 and the angular acceleration of rotation of the wheel 2. The second torque limiter 32b limits the braking/driving torque calculated by the vehicle attitude stabilization controller 31, in accordance with the slip rate of the wheel 2 and the angular acceleration of rotation of the wheel 2. In this way, the braking/driving torques are each limited in accordance with the slip rate of the wheel 2 and the angular acceleration of rotation of the wheel 2, whereby turning performance of the vehicle 1 can be optimally controlled. For example, in the case of controlling the yaw moment by a braking/driving force at a place with a low road surface frictional coefficient or the like, the braking/driving torques are controlled so that a tire grip limit is not exceeded, whereby reduction of turning performance of the vehicle 1 can be suppressed. In addition, if the slip rates and the angular accelerations of the wheels 2 satisfy a predetermined conditions, each braking/driving torque is limited without delay. Thus, the vehicle attitude can be stabilized immediately.

The first torque limiter 32a may set the braking/driving torque calculated by the yaw moment controller 28, to zero, if slip rates of the right and left wheels 2 are equal to or greater than a threshold value S and an angular acceleration of one or both of the right and left wheels 2 is equal to or greater than a threshold value ω'. The threshold value S and the threshold value ω' are optionally determined in accordance with designing or the like, respectively, and they are determined by calculating appropriate threshold values through one or both of an experiment and a simulation, for example.

In the above configuration, if the condition (1) in which the slip rates of the right and left wheels are equal to or greater than the threshold value S is satisfied and the condition (2) in which the wheel angular acceleration of one of the right and left wheels is equal to or greater than the threshold value ω' is satisfied, the first torque limiter 32a sets the braking/driving torque calculated by the yaw moment controller 28, to zero. By setting the braking/driving torque to zero as described above, breakdown of the tire force due to slip of the wheels 2 can be suppressed.

The second torque limiter 32b may decrease the braking/driving torque calculated by the vehicle attitude stabilization controller 31, in accordance with a predetermined condition, if slip rates of the right and left wheels 2 are equal to or greater than a threshold value S and an angular acceleration of one or both of the right and left wheels 2 is equal to or greater than a threshold value ω'. The threshold values S and ω' and the predetermined condition are optionally determined in accordance with designing or the like, respectively, and they are determined by calculating appropriate threshold values and an appropriate condition through one or both of an experiment and a simulation, for example.

In the above configuration, if the condition (1) in which the slip rates of the right and left wheels are equal to or greater than the threshold value S is satisfied and the condition (2) in which the wheel angular acceleration of one of the right and left wheels is equal to or greater than the threshold value ω' is satisfied, the second torque limiter 32b decreases the braking/driving torque calculated by the vehicle attitude stabilization controller 31. By decreasing the braking/driving torque as described above, breakdown of the tire force due to slip of the wheels 2 can be suppressed and the vehicle attitude can be stabilized.

The yaw moment control device 14 may further include a road surface frictional coefficient calculator 24 configured to calculate a road surface frictional coefficient from a deviation between a target lateral acceleration and an actual lateral acceleration detected by a lateral acceleration detector 21 provided to the vehicle, and may cause a response characteristic of the target yaw rate to approach an original response characteristic of the vehicle from an initial response characteristic, as the road surface frictional coefficient calculated by the road surface frictional coefficient calculator 24 decreases. In this case, it is possible to switch from the yaw moment control to the vehicle attitude stabilization control in accordance with the road surface frictional coefficient without giving uncomfortable feeling to the driver.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
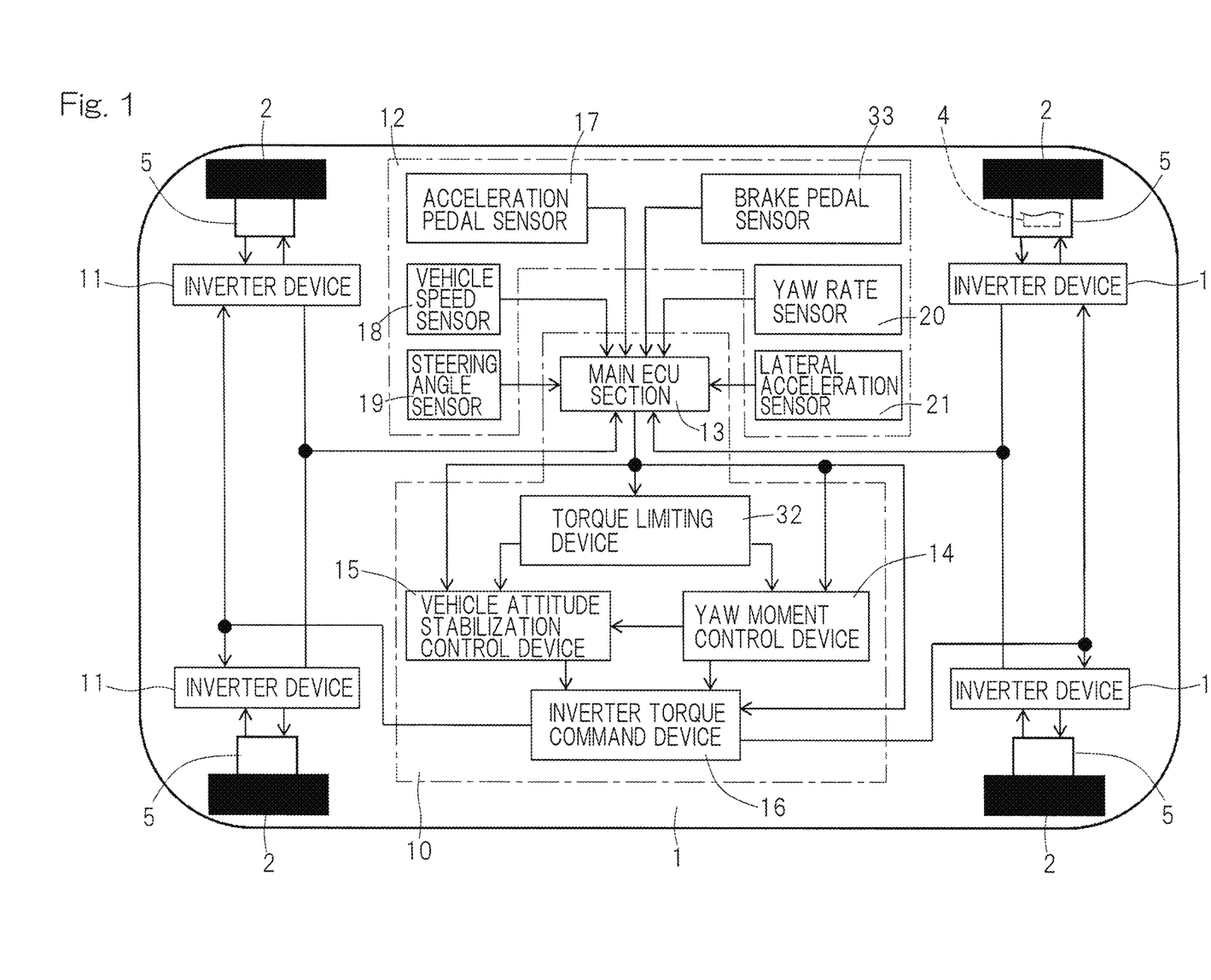
FIG. 1 is a system configuration diagram showing the conceptual configuration of a turning control system of a vehicle according to one embodiment of the present invention.

A vehicular turning control system according to one embodiment of the present invention will be described with reference to FIG. 1 to FIG. 11. As shown in FIG. 1, an example in which a vehicle 1 provided with the turning control system is of four-wheel independent driven type having in-wheel motor driving devices 5 for all the four wheels, will be described. In this vehicle 1, wheels 2 that are right and left rear wheels and wheels 2 that are right and left front wheels are independently driven by electric motors 4 each serving as a braking/driving source.

Figure 2:
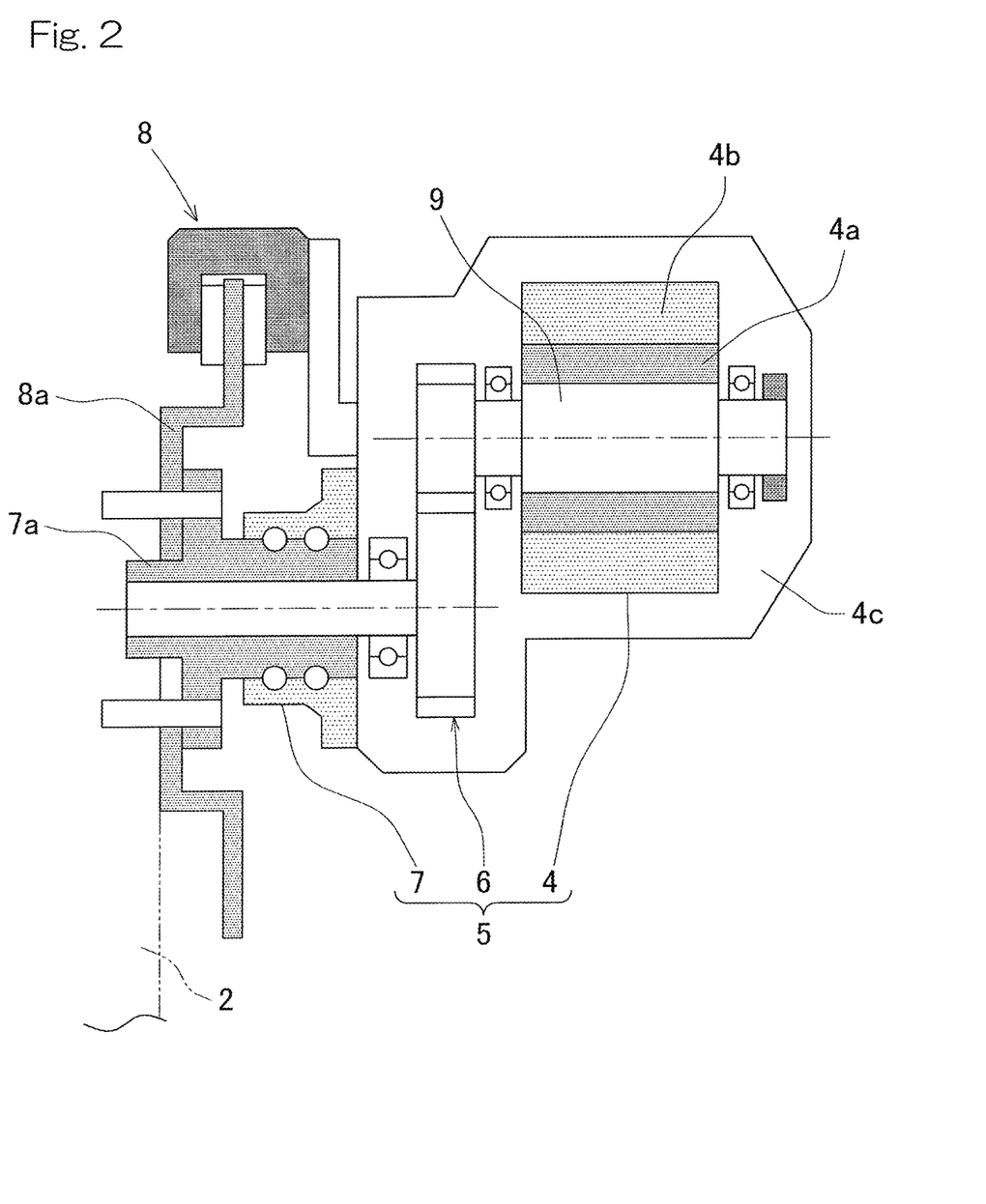
FIG. 2 is a longitudinal sectional view showing an example of an in-wheel motor driving device of the vehicle.

As shown in FIG. 2, each in-wheel motor driving device 5 has the electric motor 4, a speed reducer or reduction gear 6, and a wheel bearing 7, and these are partially or entirely provided in the wheel 2. Rotation of the electric motor 4 is transmitted to the wheel 2 via the speed reducer 6 and the wheel bearing 7. The in-wheel motor driving device 5 generates a driving torque or a braking torque by switching of the rotation direction of the electric motor 4. A brake rotor 8a composing a frictional brake device 8 is fixed to a flange portion of a hub ring 7a of the wheel bearing 7, and the brake rotor 8a rotates integrally with the wheel 2. The electric motor 4 has at least a rotor 4a and a stator 4b, further has a housing 4c, and is, for example, an interior magnet synchronous motor having permanent magnets embedded in a core portion of the rotor 4a. The electric motor 4 is a motor in which a radial gap is provided between the stator 4b fixed to the housing 4c and the rotor 4a attached to a rotary output shaft 9.

In FIG. 1, a control system will be described. In this example, the vehicular turning control system includes: a driving control device 10 configured from an electric control unit (ECU); a plurality of (in this example, four) inverter devices 11 provided for the respective electric motors 4; and sensors 12. The driving control device 10 includes a main ECU section 13, a yaw moment control device 14, a vehicle attitude stabilization control device 15, a torque limiting device 32, and an inverter torque command device 16. The driving control device 10 is composed of a computer such as a microcomputer having a processor, a ROM (Read Only Memory) having a program to be executed by the processor, various electronic circuits such as a RAM (Random Access Memory) and a co-processor, and the like. The driving control device 10 and each inverter device 11 are connected via an in-vehicle communication network such as CAN (control area network).

The main ECU section 13 has, as a basic configuration thereof, a function for performing integrated control and cooperative control for the entire vehicle, and a braking/driving command generation function. This braking/driving command generation function is a function of generating a torque command value which is an accelerating/decelerating command value, to be given to each electric motor 4, from an acceleration command value and a brake command value. The acceleration command value is a command value of operation amount detected by an acceleration pedal sensor 17 provided to an acceleration pedal (not shown). The brake command value is a command value of operation amount detected by a brake pedal sensor 33 provided to a brake pedal (not shown). When the driver operates the acceleration pedal to command for driving, the acceleration command value is inputted from the acceleration pedal sensor 17 to the main ECU section 13 in accordance with the operation amount of the acceleration pedal.

An acceleration command value from the main ECU section 13 is sent to the inverter device 11 via the yaw moment control device 14 and the like. Each inverter device 11 converts DC power of a battery (not shown) to AC power for driving the corresponding electric motor 4, and has a control unit (not shown) for controlling the output thereof, thereby controlling the corresponding electric motor 4 in accordance with the torque command value distributed for each wheel 2. Each inverter device 11 includes a power circuit unit (not shown) which is a bridge circuit or the like including switching elements for converting the DC power to AC power, and the control unit (not shown) for controlling the power circuit unit.

The sensors 12 include the acceleration pedal sensor 17, the brake pedal sensor 33, a vehicle speed sensor 18 which is a vehicle speed detector, a steering angle sensor 19 which is a steering angle detector, a yaw rate sensor 20 which is a yaw rate detector, and a lateral acceleration sensor 21 which is a lateral acceleration detector. The steering angle sensor 19 is a sensor for detecting the steering angle of a steering wheel or the like (not shown). The steering angle from the steering angle sensor 19, the vehicle speed from the vehicle speed sensor 18, the actual lateral acceleration from the lateral acceleration sensor 21, and the actual yaw rate from the yaw rate sensor 20 are inputted to the main ECU section 13. These values are outputted from the main ECU section 13 to the yaw moment control device 14 and the vehicle attitude stabilization control device 15.

<Yaw Moment Control Device 14>

Figure 3:
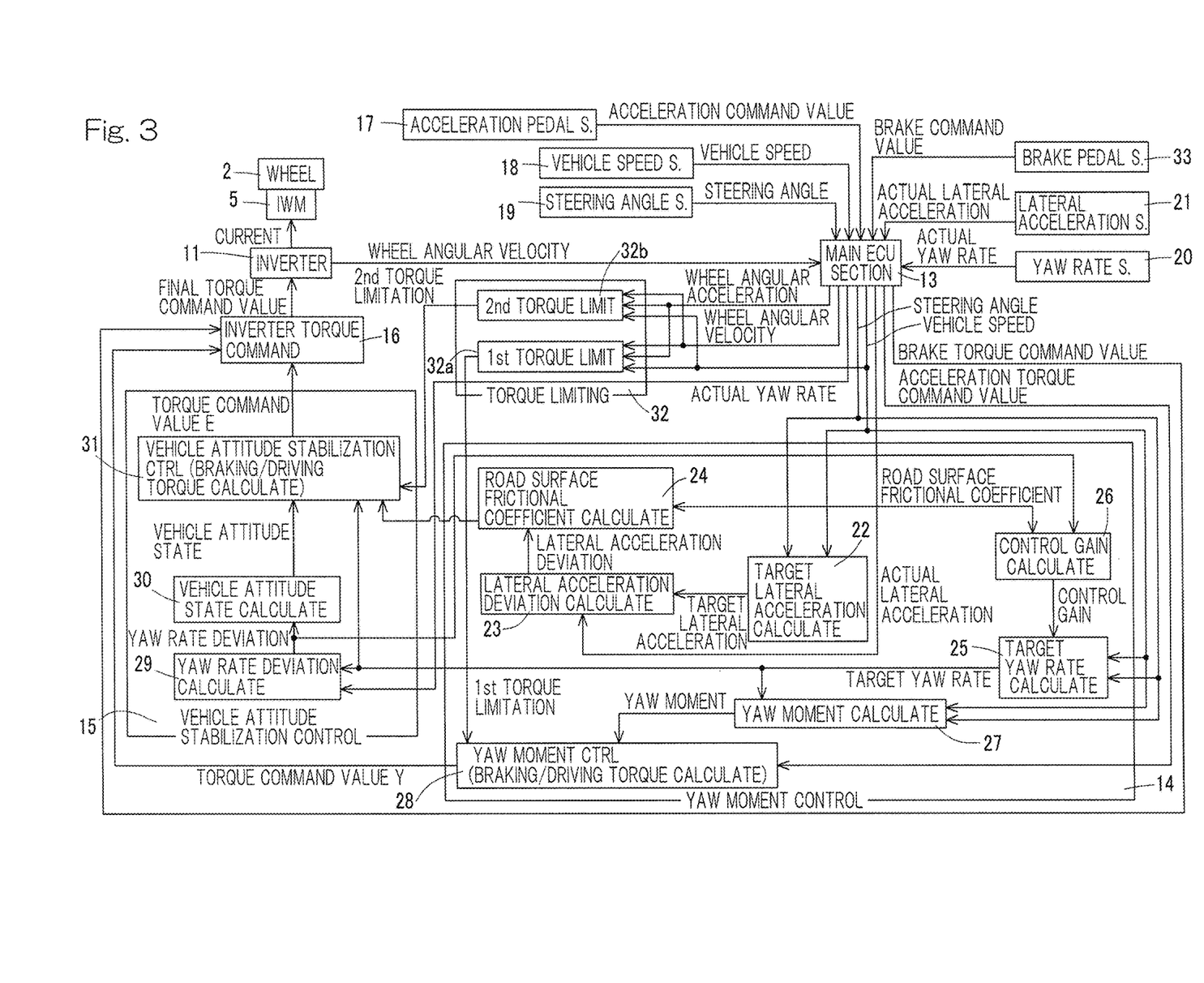
FIG. 3 is a block diagram showing a specific example of a part of the turning control system.

As shown in FIG. 3, the yaw moment control device 14 includes a target lateral acceleration calculator 22, a lateral acceleration deviation calculator 23, a road surface frictional coefficient calculator 24, a target yaw rate calculator 25, a control gain calculator 26, a yaw moment calculator 27, and a yaw moment controller (braking/driving torque calculator) 28.

A vehicle speed, a steering angle, an actual lateral acceleration, an acceleration torque command value from the acceleration pedal sensor 17, a brake torque command value from the brake pedal sensor 33 are inputted from the main ECU section 13 to the yaw moment control device 14. The target lateral acceleration calculator 22 calculates a target lateral acceleration from the vehicle speed, the steering angle, and vehicle parameters such as vehicle mass and wheelbase. The lateral acceleration deviation calculator 23 calculates a lateral acceleration deviation, from a difference between the target lateral acceleration calculated by the target lateral acceleration calculator 22 and the actual lateral acceleration inputted from the main ECU section 13.

Figure 4:
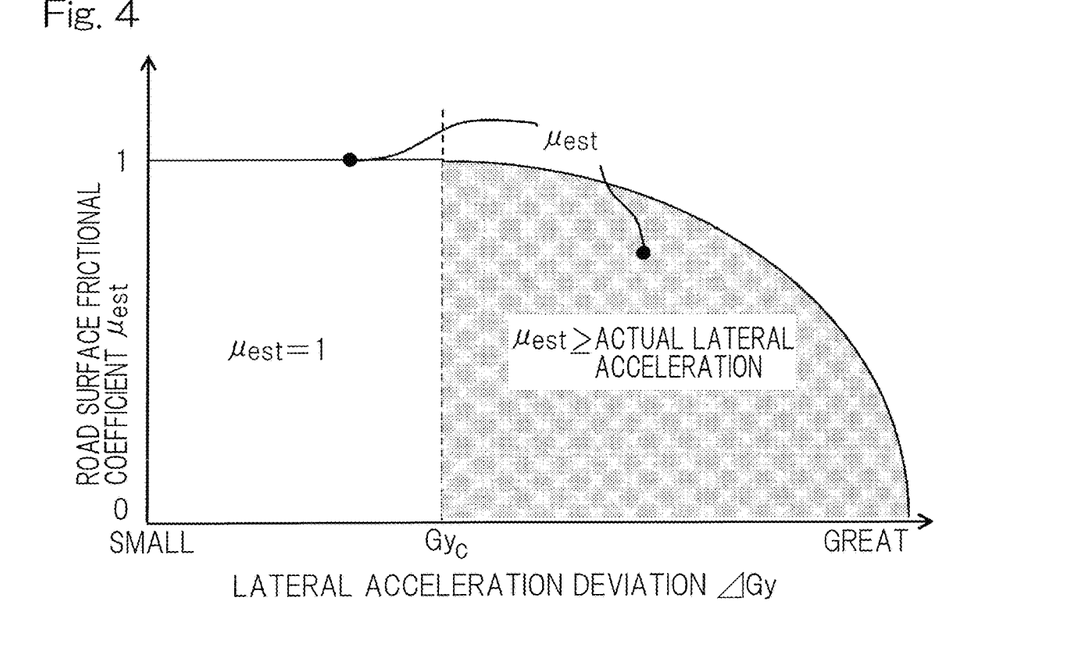
FIG. 4 shows the relationship between a lateral acceleration deviation and a road surface frictional coefficient in the turning control system.

The road surface frictional coefficient calculator 24 calculates a road surface frictional coefficient in accordance with Expressions (1) and (2) shown below. FIG. 4 shows the relationship between the lateral acceleration deviation and the road surface frictional coefficient in the turning control system. As shown in FIG. 3 and FIG. 4, if the lateral acceleration deviation outputted from the lateral acceleration deviation calculator 23 is equal to or smaller than a threshold value $Gy_c$, the road surface frictional coefficient calculator 24 sets a road surface frictional coefficient $\mu_{est}$ to "1", and if the lateral acceleration deviation is greater than the threshold value $Gy_c$, the road surface frictional coefficient calculator 24 calculates the road surface frictional coefficient $\mu_{est}$ from an actual lateral acceleration $Gy_{act}$. Where the target lateral acceleration is $Gy_{ref}$, the actual lateral acceleration is $Gy_{act}$, and the road surface frictional coefficient is $\mu_{est}$, the road surface frictional coefficient is estimated as follows.

If $Gy_{ref} - Gy_{act} \leq Gy_c, \mu_{est} = 1$  Expression (1)

If $Gy_{ref} - Gy_{act} > Gy_c, \mu_{est} \geq |Gy_{act}|$  Expression (2)

As shown in FIG. 3, the target yaw rate calculator 25 calculates a plurality of target yaw rates, using at least the vehicle speed and the steering angle. Specifically, the target yaw rate calculator 25 outputs a plurality of values calculated using a transfer function of a second-order lag system of a target yaw rate r(s) relative to an actual steering angle δ(s), shown in Expression (3), for example.

[Mathematical 1]

$$\frac{r(s)}{\delta(s)} = G_\delta^r(0)\frac{(\alpha\omega_n)^2(1+T_r s)}{(\alpha\omega_n)^2 + 2\left(\frac{1}{\lambda}\zeta\right)(\alpha\omega_n)s + s^2}$$ Expression (3)

Expression (3) is constituted of $G_\delta^r(0)$ which is a yaw angular velocity gain constant, ωn which is a natural frequency in the yaw direction, ζ which is an attenuation coefficient in the yaw direction, $T_r$ which is a yaw angular velocity time constant, s which is the Laplace operator, α which is a control gain of the natural frequency $\omega_n$, and λ which is a control gain of the attenuation coefficient ζ, and these values are calculated from the vehicle speed and vehicle parameters such as vehicle mass and wheelbase. If the control gain α of the natural frequency $\omega_n$ or the control gain λ of the attenuation coefficient ζ is greater than "1", rising of the target yaw rate becomes faster, and if the control gain α and λ is "1", the original yaw response characteristic of the vehicle is obtained.

The control gain calculator 26 calculates the respective control gains α, λ to be used in the target yaw rate calculator 25, in accordance with, in this example, one or both of the road surface frictional coefficient calculated by the road surface frictional coefficient calculator 24 and a yaw rate deviation calculated by a yaw rate deviation calculator 29 described later. The control gain α of the natural frequency $\omega_n$ and the control gain λ of the attenuation coefficient ζ have substantially the same characteristic. Therefore, regarding the control gain mentioned hereafter, description will be given using the control gain α of the natural frequency $\omega_n$ as an example, while description for the control gain λ of the attenuation coefficient ζ is omitted.

Figure 5:
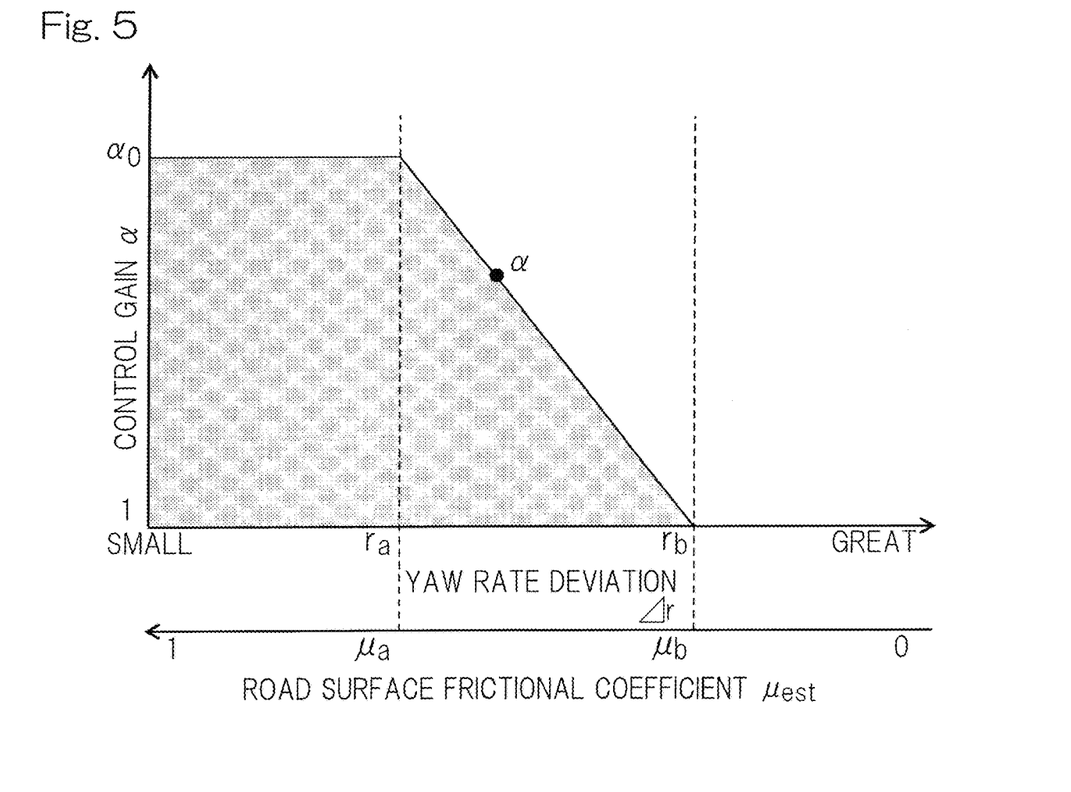
FIG. 5 shows the relationship between a control gain and each of a yaw rate deviation and the road surface frictional coefficient in the turning control system.

Here, as shown in FIG. 5, two threshold values may be provided for the road surface frictional coefficient or the yaw rate deviation, respectively, to determine the control gain α. For example, if the road surface frictional coefficient is equal to or greater than a first threshold value $\mu_a$ or the yaw rate deviation is equal to or smaller than a first threshold value $r_a$, the control gain α is set to an initial value (predetermined yaw response characteristic) $\alpha_0$. If the road surface frictional coefficient is smaller than the first threshold value $\mu_a$ or the yaw rate deviation is greater than the first threshold value $r_a$, the control gain α is caused to approach "1" from the initial value $\alpha_0$. Further, if the road surface frictional coefficient is smaller than a second threshold value $\mu_b$ or the yaw rate deviation is greater than a second threshold value $r_b$, the control gain α is set to "1".

In the control gain calculator 26 shown in FIG. 3, when the control gain is changed from the original yaw response characteristic of the vehicle to the initial value, the amount of change in the control gain per time is set to be smaller than when the control gain is changed from the initial value to the original yaw response characteristic of the vehicle. Specifically, as shown in FIG. 6, as compared to the case where the control gain α decreases from the initial value $\alpha_0$ to "1" which is the original yaw response characteristic of the vehicle, the amount of change per time, when the control gain α returns from "1" to the initial value $\alpha_0$, is smaller.

Figure 6:
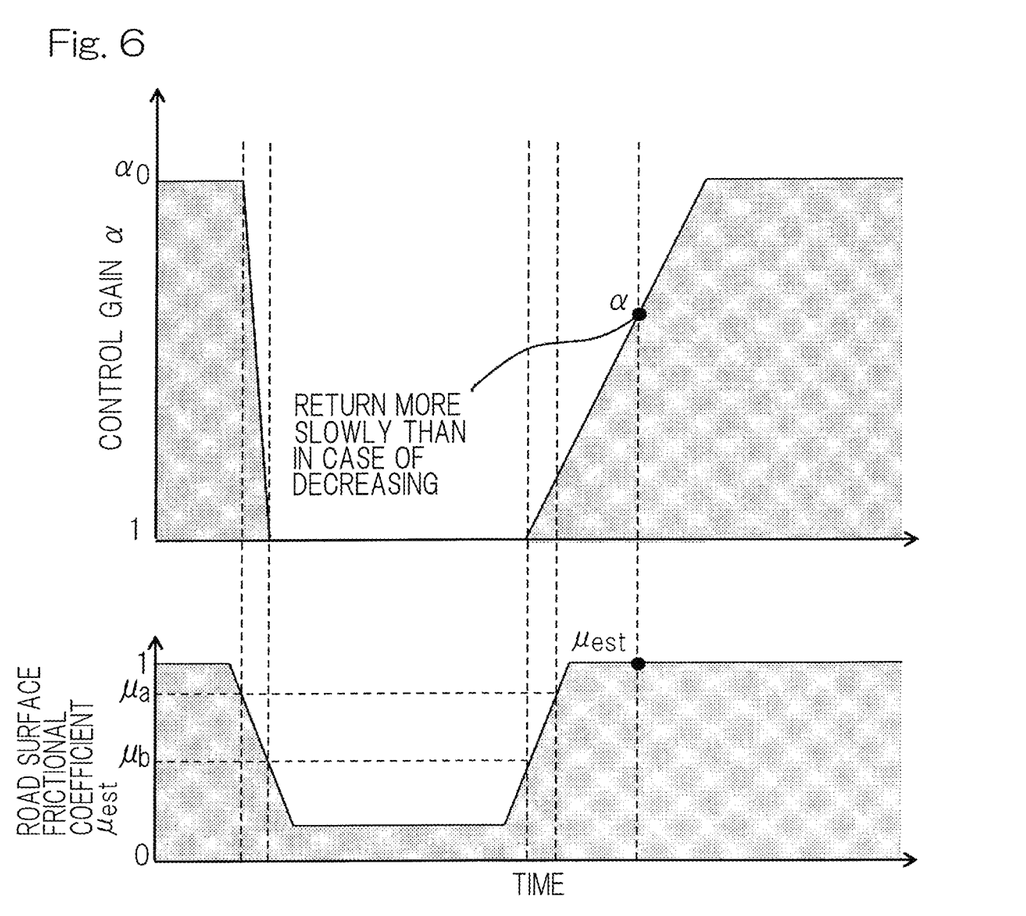
FIG. 6 shows an example of transition of the control gain in the turning control system.

As shown in FIG. 6, at a place with a low road surface frictional coefficient, the tire grip force is likely to be lost, and therefore the control gain calculator 26 (FIG. 3) immediately decreases the control gain α, to decrease the braking/driving torque in the yaw moment control. At a place with a high road surface frictional coefficient, the tire grip force is restored, and therefore the control gain calculator 26 gradually returns the control gain α to the initial value $\alpha_0$, to increase the braking/driving torque in the yaw moment control. Thus, uncomfortable feeling is not given to the driver.

As shown in FIG. 3, the yaw moment calculator 27 calculates a braking/driving torque which is a braking torque or a driving torque for each wheel 2 in accordance with the target yaw rate calculated by the target yaw rate calculator 25, thereby calculating a yaw moment that is to occur in the vehicle. The yaw moment calculator 27 calculates a plurality of yaw moments. For example, the yaw moment calculator 27 outputs a plurality of values calculated using a transfer function of a third-order lag system of a yaw moment $M_Z(s)$ relative to the actual steering angle δ(s), shown in Expression (4).

[Mathematical 2]

$$\frac{M_Z(s)}{\delta(s)} = \frac{G_\delta^r(0)\dfrac{(\alpha\omega_n)^2(1+T_r s)}{(\alpha\omega_n)^2 + 2\left(\frac{1}{\lambda}\zeta\right)(\alpha\omega_n)s + s^2} - G_\delta^r(0)\dfrac{\omega_n^2(1+T_r s)}{\omega_n^2 + 2\zeta\omega_n s + s^2}}{G_M^r(0)\dfrac{\omega_n^2(1+T_M s)}{\omega_n^2 + 2\zeta\omega_n s + s^2}}$$ Expression (4)

As in Expression (3), Expression (4) is constituted of GAO) which is a yaw angular velocity gain constant, $\omega_n$ which is a natural frequency in the yaw direction, ζ which is an attenuation coefficient in the yaw direction, $T_r$ which is a yaw angular velocity time constant, $G_M^r(0)$ which is a yaw moment gain constant, $T_M$ which is a yaw moment time constant, s which is the Laplace operator, a which is a control gain of the natural frequency $\omega_n$, and λ which is a control gain of the attenuation coefficient ζ, and these values are calculated from the vehicle speed and vehicle parameters such as vehicle mass and wheelbase.

From expression (4), it is found that, if the control gains α and λ are "1", the numerator is zero and thus the yaw moment $M_Z(s)$ relative to the actual steering angle δ(s) is zero. In accordance with the acceleration torque command value inputted from the main ECU section 13 and the yaw moment calculated by Expression (4), the yaw moment controller (braking/driving torque calculator) 28 determines the braking/driving torques for the four wheels, and issues a torque command value Y to the inverter torque command device 16. If vehicle attitude stabilization control is not performed, the torque command value Y is used as a final command torque. In the following description, the torque command value Y may be referred to as braking/driving torque Y.

Figure 10:
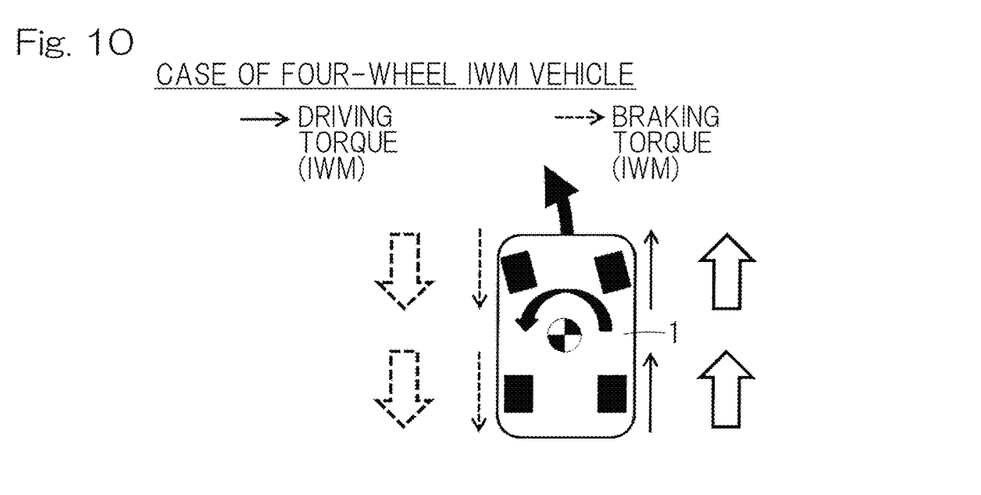
FIG. 10 shows an example in which a yaw moment is generated in such a direction as to improve turning performance, when the vehicle turns left.

FIG. 10 shows an example in which a yaw moment is generated in such a direction as to improve turning performance, when the vehicle 1 turns left. In FIG. 10, a solid-line thin arrow indicates a driving torque by the driving source. A broken-line thin arrow indicates a braking torque by the driving source (the same applies to FIG. 12). A thick filled arrow indicates a total value of a braking torque and a driving torque, a thick solid-line hollow arrow indicates a total value of driving torques, and a thick broken-line hollow arrow indicates a total value of braking torques (the same applies to FIG. 12).

In the vehicle shown in FIG. 10, a yaw moment is generated by output of a driving torque from the turning outer wheels and output of a braking torque from the turning inner wheels. If the driver performs an accelerating operation or a braking operation during turning of the vehicle 1, a driving torque or a braking torque is applied and therefore the vehicle 1 is accelerated or decelerated.

<Vehicle Attitude Stabilization Control Device 15>

The vehicle attitude stabilization control device 15 performs control for stabilizing the attitude of the vehicle. As shown in FIG. 3, the actual yaw rate is inputted from the main ECU section 13 to the vehicle attitude stabilization control device 15. The vehicle attitude stabilization control device 15 includes a yaw rate deviation calculator 29, a vehicle attitude state calculator 30, and a vehicle attitude stabilization controller (braking/driving torque calculator) 31. The yaw rate deviation calculator 29 calculates a yaw rate deviation, from a difference between the actual yaw rate and the target yaw rate calculated by the target yaw rate calculator 25.

The vehicle attitude state calculator 30 calculates the attitude state of the vehicle from the magnitude of the yaw rate deviation calculated by the yaw rate deviation calculator 29.

Figure 11:
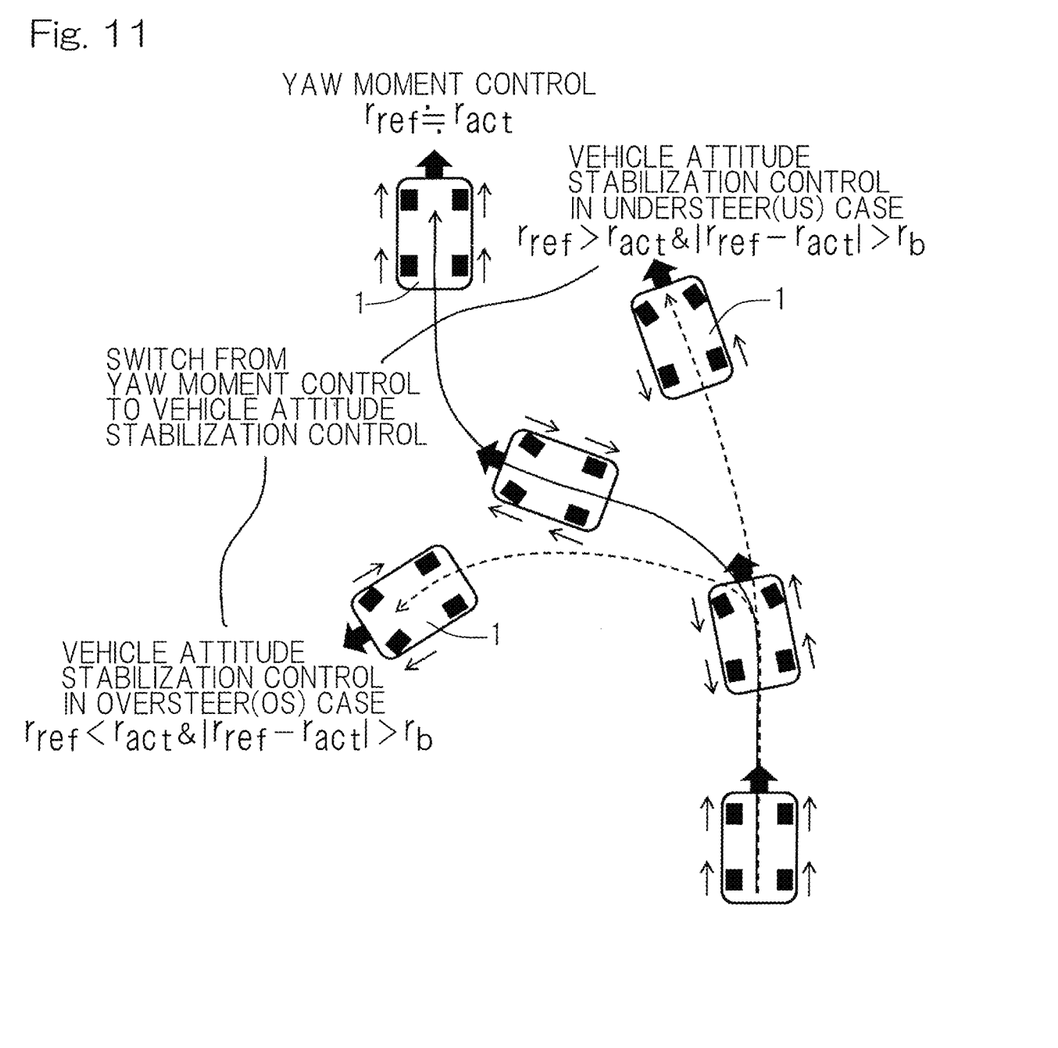
FIG. 11 shows three states of the attitude of the vehicle.

FIG. 11 shows three states of the attitude of the vehicle 1. In the case where the target yaw rate and the actual yaw rate are substantially equal, the above yaw moment control device 14 (FIG. 3) performs the yaw moment control to command braking torques or driving torques in the same direction for the front and rear wheels on one side as shown in FIG. 11, thereby generating a yaw moment.

On the other hand, at a place with a low road surface frictional coefficient, or the like, it is likely that the vehicle fails to take a curve, or spins. Where the target yaw rate is $r_{ref}$, the actual yaw rate is $r_{act}$, and the threshold value is $r_b$, the vehicle attitude state calculator 30 (FIG. 3) determines that the vehicle is in an understeer (US) state if Expression (5) is satisfied. The vehicle attitude state calculator 30 (FIG. 3) determines that the vehicle is in an oversteer (OS) state if Expression (6) is satisfied.

Understeer state, if $r_{ref} > r_{act}$ and $|r_{ref} - r_{act}| > r_b$   Expression (5)

Oversteer state, if $r_{ref} < r_{act}$ and $|r_{ref} - r_{act}| > r_b$   Expression (6)

A yaw moment is generated using the rear wheels as control wheels in the case of understeer state or using the front wheels as control wheels in the case of oversteer state, whereby the attitude of the vehicle 1 is stabilized.

As shown in FIG. 3, the vehicle attitude stabilization controller (braking/driving torque calculator) 31 of the vehicle attitude stabilization control device 15 calculates a braking/driving torque to be commanded, on the basis of the road surface frictional coefficient calculated by the road surface frictional coefficient calculator 24, the vehicle attitude state calculated by the vehicle attitude state calculator 30, and the target yaw rate calculated by the target yaw rate calculator 25, and issues the calculated value as a torque command value E. In the following description, the torque command value E may be referred to as braking/driving torque E.

<Torque Limiting Device 32>

The torque limiting device 32 includes a first torque limiter 32a for limiting the braking/driving torque Y calculated by the yaw moment controller 28, and a second torque limiter 32b for limiting the braking/driving torque E calculated by the vehicle attitude stabilization controller 31. At least an angular acceleration ω of the wheel and the vehicle speed V are inputted from the main ECU section 13 to the first and second torque limiters 32a, 32b. The first torque limiter 32a limits the braking/driving torque in accordance with the slip rate of the wheel and the angular acceleration of rotation of the wheel. The second torque limiter 32b limits the braking/driving torque in accordance with the slip rate of the wheel and the angular acceleration of rotation of the wheel.

If the absolute values of the slip rates of the right and left wheels are equal to or greater than a threshold value S and the angular acceleration of one or both of the right and left wheels is equal to or greater than a threshold value ω', the first torque limiter 32a sets the braking/driving torque calculated by the yaw moment controller 28, to zero. The threshold value ω' is a value obtained by differentiating the angular velocity ω.

If the absolute values of the slip rates of the right and left wheels are equal to or greater than the threshold value S and the angular acceleration of one or both of the right and left wheels is equal to or greater than the threshold value ω', the second torque limiter 32b decreases the braking/driving torque calculated by the vehicle attitude stabilization controller 31, in accordance with a predetermined condition.

Figure 7:
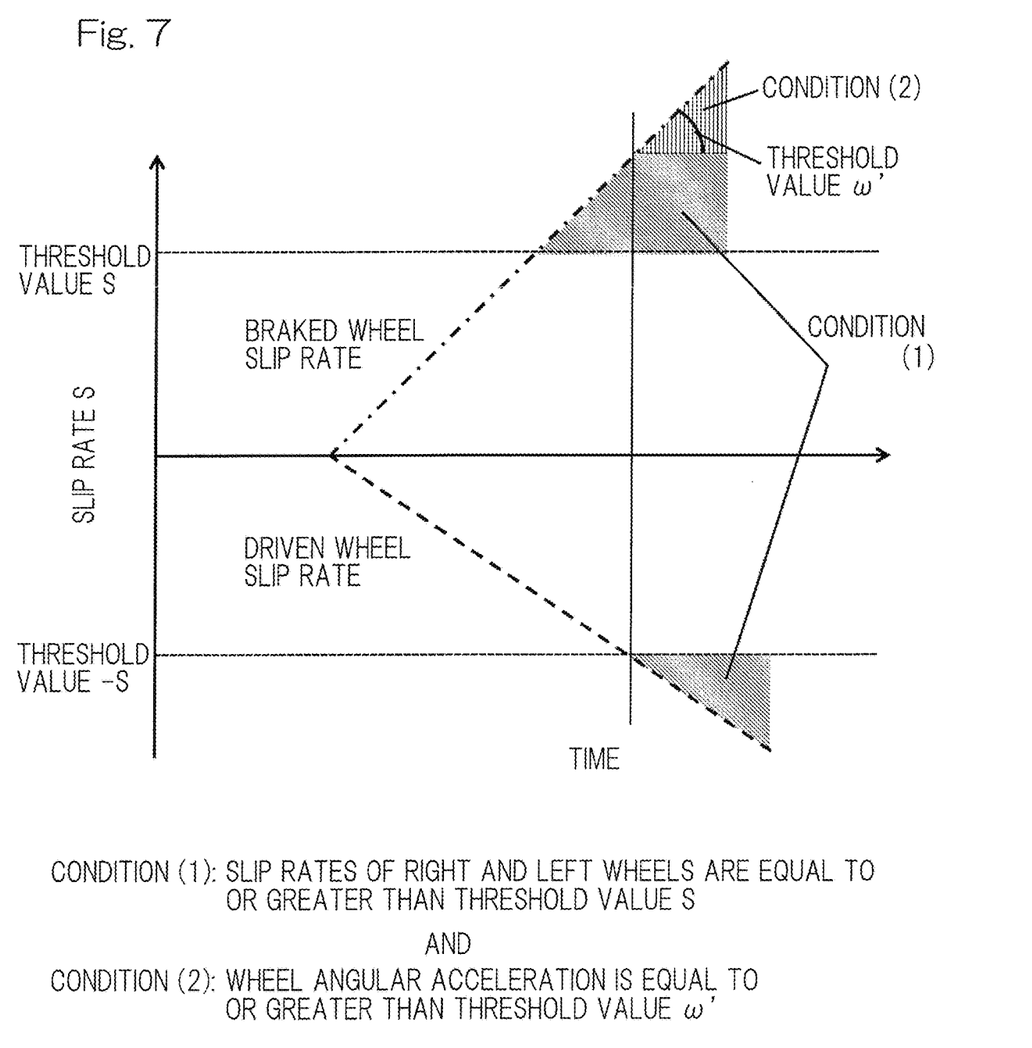
FIG. 7 shows conditions for limiting a braking/driving torque in the turning control system.

The slip rate is calculated by subtracting, from the vehicle speed V, a value rω obtained by multiplying a radius r of the wheel with the angular velocity ω of rotation of the wheel (that is, V−rω), and then dividing the value (V−rω) by the vehicle speed V (that is, (V−rω)/V). FIG. 7 shows conditions for limiting the braking/driving torque in the turning control system. FIG. 7 shows the case where the slip rate of the braked wheel is equal to or greater than the threshold value S, the slip rate of the driving wheel is equal to or greater than the threshold value −S, and the angular acceleration of the braked wheel is equal to or greater than the threshold value ω'.

Figure 8:
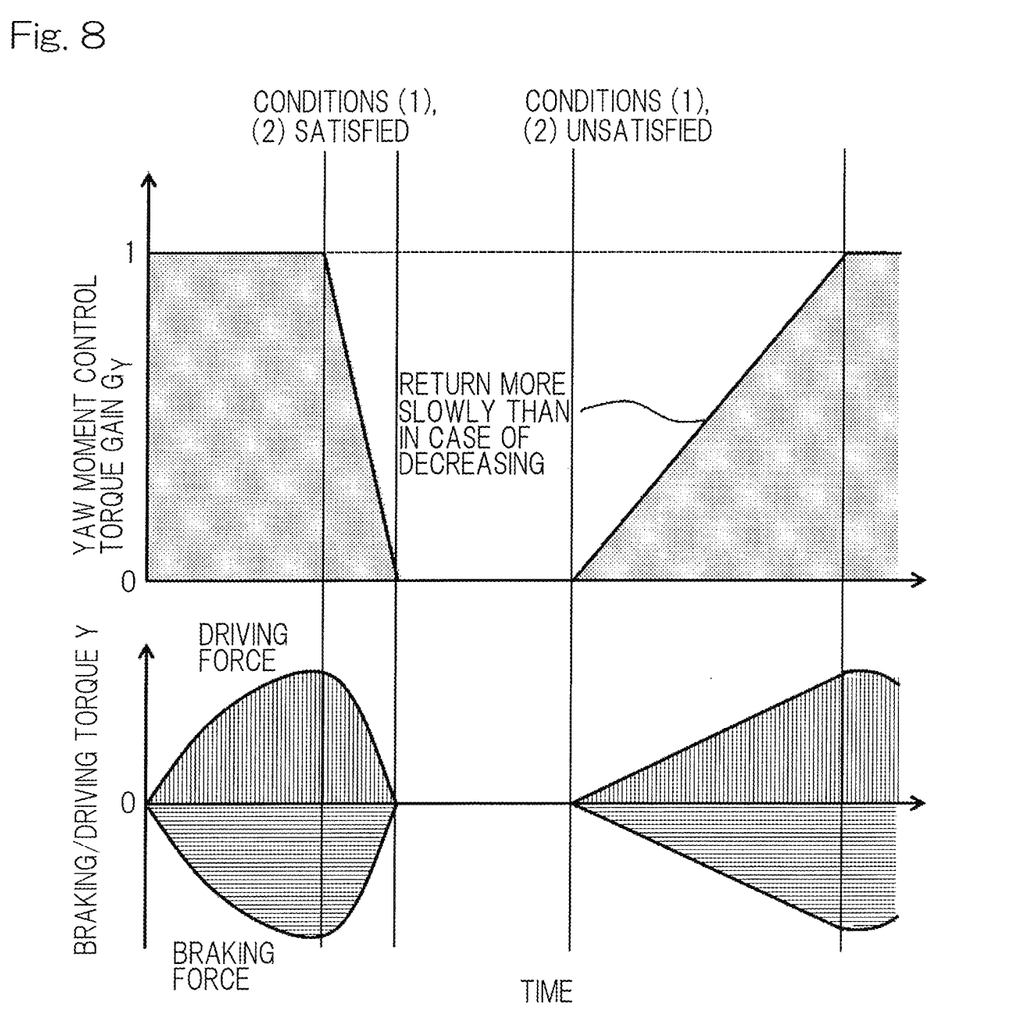
FIG. 8 shows transition of a gain for the braking/driving torque in a yaw moment controller of the turning control system.
Figure 9:
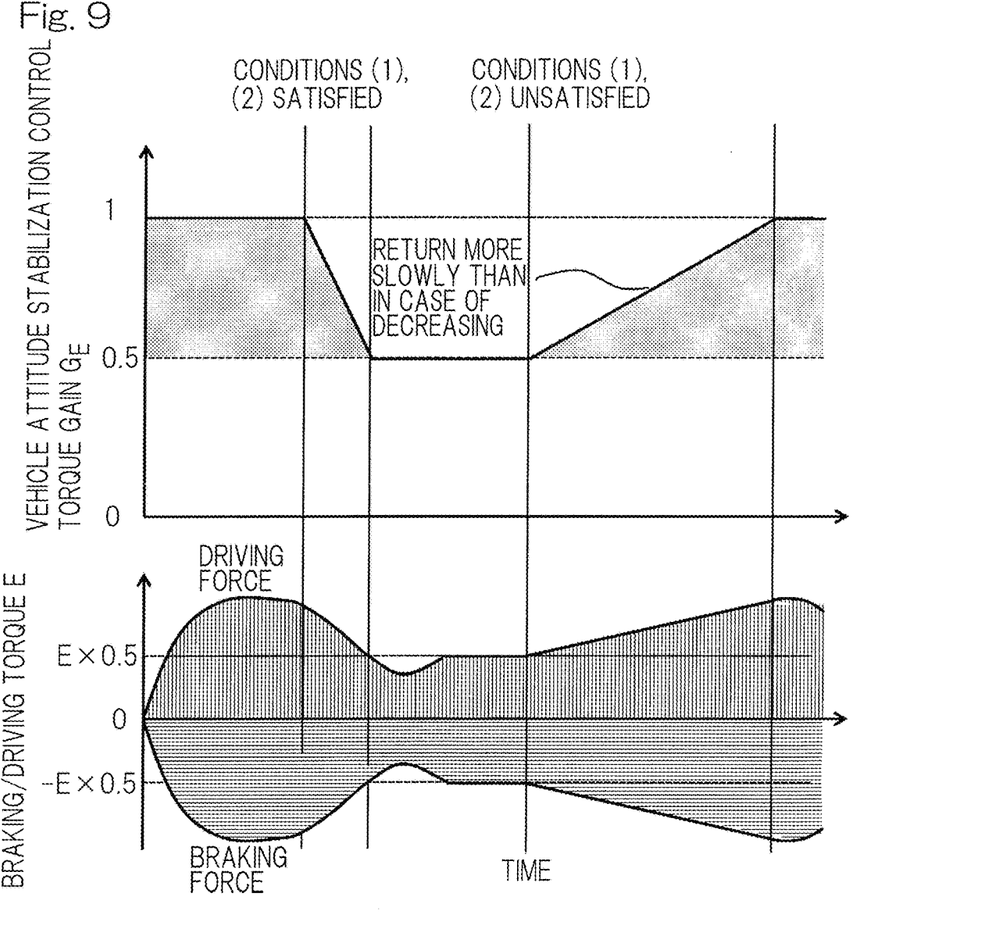
FIG. 9 shows transition of a gain for the braking/driving torque in a vehicle attitude stabilization controller of the turning control system.

As shown in FIG. 8, if conditions (1), (2) are satisfied, the first torque limiter 32a (FIG. 3) sets the gain (torque gain) $G_Y$ for the braking/driving torque Y of the yaw moment controller 28 (FIG. 3), to zero. As shown in FIG. 9, if the conditions (1), (2) are satisfied, the second torque limiter 32b (FIG. 3) halves the gain (torque gain) $G_E$ for the braking/driving torque E of the vehicle attitude stabilization controller 31 (FIG. 3), and limits the braking/driving torque E, using the driving force at that time as an upper limit value and the braking force at that time as a lower limit value. It is noted that, in both of the yaw moment control in FIG. 8 and the vehicle attitude stabilization control in FIG. 9, when the conditions (1), (2) are unsatisfied and the torque gain $G_Y$, $G_E$ is returned (increased) to its original value, the torque gain rises with a smaller change amount per time than when decreased.

<First Torque Limiter>

|Slip rates of right and left wheels|≥threshold value S   Condition (1):

Angular velocity of rotation of one of right and left wheels≥threshold value ω'   Condition (2):

If the condition (1) is satisfied and the condition (2) is satisfied, the following expression is used.

"Braking/driving torque Y in yaw moment control=Y×0"

<Second Torque Limiter>

|Slip rates of right and left wheels|≥threshold value
S                                                                       Condition (1):

Angular velocity of rotation of one of right and left
wheels≥threshold value $\omega'$                       Condition (2):

If the condition (1) is satisfied and the condition (2) is satisfied, the following expression is used.

"Braking/driving torque E in vehicle attitude stabilization control=$E \times 0.5$"

As shown in FIG. 3 and FIG. 8, if one or both of the conditions (1), (2) are unsatisfied, the first torque limiter 32a keeps the torque gain $G_Y$ at "1". As shown in FIG. 3 and FIG. 9, if one or both of the conditions (1), (2) are unsatisfied, the second torque limiter 32b keeps the torque gain $G_E$ at "1".

As shown in FIG. 3, the torque command value Y and the torque command value E are inputted to the inverter torque command device 16 which calculates the final torque command value. The inverter torque command device 16 issues the final torque command value calculated from the torque command value Y and the torque command value E, to each inverter device 11. The inverter device 11 controls current so as to achieve the final torque command value, thereby driving the in-wheel motor driving device 5.

The sections in the yaw moment control device 14, the vehicle attitude stabilization control device 15, and the torque limiting device 32 composing the driving control device 10 and the sections (not shown) in the inverter torque command device 16 are each configured specifically by a hardware circuit or a software function on a processor (not shown) that is capable of outputting results through calculation, using a look up table (LUT) realized by software or hardware, a predetermined conversion function stored in a library of software, hardware equivalent thereto, or the like, and as necessary, a comparison function or an arithmetic operation function in the library, hardware equivalent thereto, or the like.

<Operations and Effects>

In the vehicular turning control system described above, the first torque limiter 32a limits the braking/driving torque calculated by the yaw moment controller 28, in accordance with the slip rate of the wheel 2 and the angular acceleration of rotation of the wheel 2. The second torque limiter 32b limits the braking/driving torque calculated by the vehicle attitude stabilization controller 31, in accordance with the slip rate of the wheel 2 and the angular acceleration of rotation of the wheel 2. In this way, the braking/driving torques are each limited in accordance with the slip rate of the wheel 2 and the angular acceleration of rotation of the wheel 2, whereby turning performance of the vehicle can be optimally controlled. For example, in the case of controlling the yaw moment by the braking/driving force at a place with a low road surface frictional coefficient or the like, the braking/driving torques are controlled so that the tire grip limit is not exceeded, whereby reduction of turning performance of the vehicle 1 can be suppressed. In addition, if the slip rates and the angular accelerations of the wheels 2 satisfy the predetermined conditions, each braking/driving torque is limited without delay. Thus, the vehicle attitude can be stabilized immediately.

If the condition (1) in which the slip rates of the right and left wheels are equal to or greater than the threshold value S is satisfied and the condition (2) in which the wheel angular acceleration of one of the right and left wheels is equal to or greater than the threshold value $\omega'$ is satisfied, the first torque limiter 32a sets the braking/driving torque calculated by the yaw moment controller 28, to zero. By setting the braking/driving torque to zero as described above, breakdown of the tire force due to slip of the wheel 2 can be suppressed.

If the condition (1) in which the slip rates of the right and left wheels are equal to or greater than the threshold value S is satisfied and the condition (2) in which the wheel angular acceleration of one of the right and left wheels is equal to or greater than the threshold value $\omega'$ is satisfied, the second torque limiter 32b decreases the braking/driving torque calculated by the vehicle attitude stabilization controller 31. By decreasing the braking/driving torque as described above, breakdown of the tire force due to slip of the wheel 2 can be suppressed and the vehicle attitude can be stabilized.

The yaw moment control device 14 includes the road surface frictional coefficient calculator 24, and causes the target yaw rate response characteristic to approach the original response characteristic of the vehicle from the initial response characteristic, as the road surface frictional coefficient calculated by the road surface frictional coefficient calculator 24 decreases. Therefore, it is possible to switch from the yaw moment control to the vehicle attitude stabilization control in accordance with the road surface frictional coefficient without giving uncomfortable feeling to the driver.

OTHER EMBODIMENTS

Figure 12:
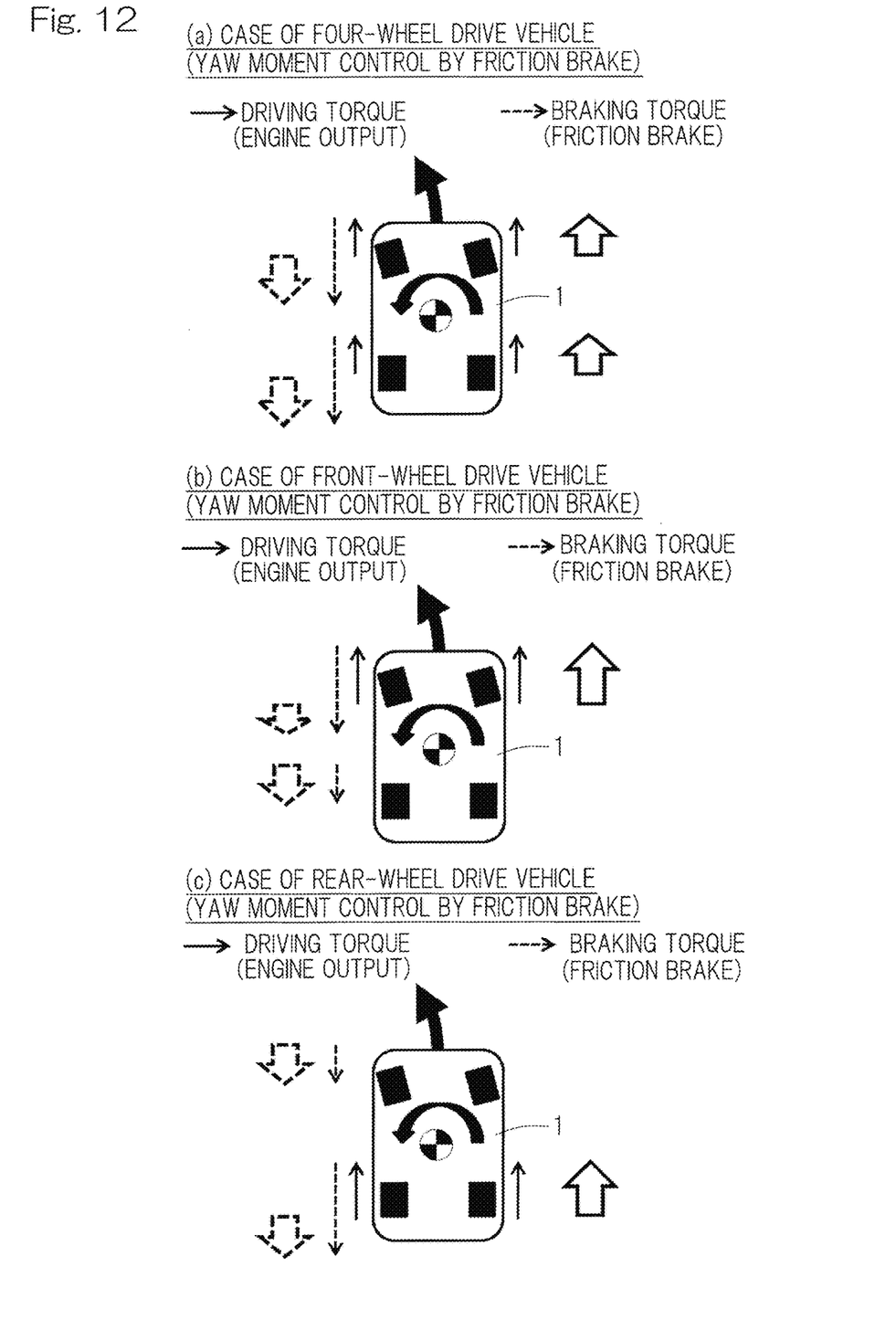
FIG. 12 shows examples in various driving types in which a yaw moment is generated in such a direction as to improve turning performance, when the vehicle turns left, according to other embodiments of the present invention.

As the vehicle, other than a vehicle having the in-wheel motor driving devices for all the four wheels as described above, a vehicle using a friction brake for a braking torque may be applied. It is possible to perform yaw moment control using a friction brake, in the case of a four-wheel drive vehicle using an internal combustion engine as a driving source as shown in the chart (a) of FIG. 12, the case of a front-wheel drive vehicle having the same driving source as shown in the chart (b) of FIG. 12, and the case of a rear-wheel drive vehicle having the same driving source as shown in the chart (c) of FIG. 12. In each vehicle 1 shown in FIG. 12, driving torques by engine output are outputted from the turning outer wheels, and braking torques greater than the driving torques are outputted from the turning inner wheels by the friction brake, whereby a yaw moment is generated. It is noted that the meanings of arrows in FIG. 12 are as described above.

In the in-wheel motor driving device, a cycloidal speed reducer, a planetary reducer, a speed reducer with two parallel shafts, or another speed reducer can be applied, or the in-wheel motor driving device may be a so-called direct motor type in which a speed reducer is not used. As the vehicle, the following vehicle may be applied: outputs of two motors provided in the vehicle body corresponding to the right and left wheels, respectively, are transmitted to to the respective wheels via a drive shaft and the like and a braking/driving torque for each wheel is controlled independently.

Although the present invention has been fully described in connection with the preferred embodiments thereof with reference to the accompanying drawings, various additions, modifications, and/or deletions may be done without deviating from the scope of the present invention. Accordingly, such modifications and the like are to be construed as included in the scope of the present invention.

REFERENCE NUMERALS

1 . . . vehicle
2 . . . wheel

4 . . . electric motor (braking/driving source)
14 . . . yaw moment control device
15 . . . vehicle attitude stabilization control device
20 . . . yaw rate sensor (yaw rate detector)
24 . . . road surface frictional coefficient calculator
25 . . . target yaw rate calculator
27 . . . yaw moment calculator
28 . . . yaw moment controller
30 . . . vehicle attitude state calculator
31 . . . vehicle attitude stabilization controller
32a . . . first torque limiter
32b . . . second torque limiter

What is claimed is:

1. A vehicular turning control system controlling a turning characteristic of a vehicle having braking/driving sources capable of independently controlling a braking/driving torque which is a braking torque or a driving torque for each of wheels, the vehicular turning control system comprising:
a yaw moment control device configured to control a yaw moment that occurs in the vehicle; and
a vehicle attitude stabilization control device configured to perform control for stabilizing an attitude of the vehicle, wherein
the yaw moment control device includes
a target yaw rate calculator configured to calculate a target yaw rate from a vehicle speed and a steering angle,
a yaw moment calculator configured to calculate the yaw moment that occurs in the vehicle, from the vehicle speed, the steering angle, and the target yaw rate calculated by the target yaw rate calculator, and
a yaw moment controller configured to calculate a braking/driving torque for each wheel in accordance with the yaw moment calculated by the yaw moment calculator, and
the vehicle attitude stabilization control device includes
a vehicle attitude state calculator configured to calculate an attitude state of the vehicle from a deviation between the target yaw rate and an actual yaw rate detected by a yaw rate detector provided to the vehicle, and
a vehicle attitude stabilization controller configured to calculate a braking/driving torque for each wheel in accordance with the attitude state of the vehicle calculated by the vehicle attitude state calculator,
the vehicular turning control system further comprising:
a first torque limiter configured to limit the braking/driving torque calculated by the yaw moment controller, in accordance with a slip rate of the wheel and an angular acceleration of rotation of the wheel; and
a second torque limiter configured to limit the braking/driving torque calculated by the vehicle attitude stabilization controller, in accordance with a slip rate of the wheel and an angular acceleration of rotation of the wheel.

2. The vehicular turning control system as claimed in claim 1, wherein
the first torque limiter sets the braking/driving torque calculated by the yaw moment controller, to zero, if slip rates of the right and left wheels are equal to or greater than a threshold value S and an angular acceleration of one or both of the right and left wheels is equal to or greater than a threshold value $\omega'$.

3. The vehicular turning control system as claimed in claim 1, wherein
the second torque limiter decreases the braking/driving torque calculated by the vehicle attitude stabilization controller, in accordance with a predetermined condition, if slip rates of the right and left wheels are equal to or greater than a threshold value S and an angular acceleration of one or both of the right and left wheels is equal to or greater than a threshold value $\omega'$.

4. The vehicular turning control system as claimed in claim 1, wherein
the yaw moment control device further includes a road surface frictional coefficient calculator configured to calculate a road surface frictional coefficient from a deviation between a target lateral acceleration and an actual lateral acceleration detected by a lateral acceleration detector provided to the vehicle, and causes a response characteristic of the target yaw rate to approach an original response characteristic of the vehicle from an initial response characteristic, as the road surface frictional coefficient calculated by the road surface frictional coefficient calculator decreases.

* * * * *